(12) United States Patent
Childress

(10) Patent No.: US 6,268,049 B1
(45) Date of Patent: Jul. 31, 2001

(54) CIRCULATION SYSTEM USING COLUMN CORE

(76) Inventor: James J. Childress, 4437 E. Mercer Way, Mercer Island, WA (US) 98040

( * ) Notice: Subject to any disclaimer, the term of this patent is extended or adjusted under 35 U.S.C. 154(b) by 0 days.

(21) Appl. No.: 09/122,217

(22) Filed: Jul. 23, 1998

Related U.S. Application Data (62) Division of application No. 08/582,297, filed on Jan. 3, 1996, now Pat. No. 6,027,798.
(60) Provisional application No. 60/007,190, filed on Nov. 1, 1995.

(51) Int. Cl.[7] .................. B32B 5/00; B32B 5/18; B32B 7/04; B64D 15/00; B64D 15/02
(52) U.S. Cl. .................. 428/309.9; 428/71; 428/86; 428/119; 428/223; 244/123; 244/134 R; 244/134 B; 165/49; 165/168; 165/169
(58) Field of Search .................. 428/119, 71, 86, 428/112, 223, 309.9, 317.9; 244/134 B, 123, 134, 117, 134 R; 165/168, 169, 49

(56) References Cited

U.S. PATENT DOCUMENTS

| | | |
|---|---|---|
| 2,762,739 | 9/1956 | Weiss . |
| 3,205,106 | 9/1965 | Cross . |
| 3,328,218 | 6/1967 | Noyes . |
| 3,579,411 * | 5/1971 | Mackie et al. .......... 161/53 |
| 3,833,695 | 9/1974 | Vidal . |
| 4,164,526 | 8/1979 | Clay et al. . |
| 4,196,251 * | 4/1980 | Windecker .......... 428/311 |
| 4,212,348 * | 7/1980 | Kobayashi .......... 165/49 |
| 4,489,123 | 12/1984 | Schijve et al. . |
| 4,808,461 | 2/1989 | Boyce et al. . |
| 4,863,791 | 9/1989 | Steward et al. . |
| 4,923,146 * | 5/1990 | Anthony .......... 244/117 A |
| 5,011,098 * | 4/1991 | McLaren et al. .......... 244/134 B |
| 5,041,321 | 8/1991 | Bendig . |
| 5,042,569 * | 8/1991 | Siegmund .......... 165/56 |
| 5,102,723 | 4/1992 | Pepin . |
| 5,186,776 | 2/1993 | Boyce et al. . |
| 5,376,598 | 12/1994 | Preedy et al. . |
| 5,441,682 | 8/1995 | Newton et al. . |
| 5,445,861 | 8/1995 | Baker . |
| 5,466,506 | 11/1995 | Freitas et al. . |
| 5,543,194 | 8/1996 | Rudy . |
| 5,582,893 | 12/1996 | Böttger et al. . |
| 5,741,574 * | 4/1998 | Boyce et al. .......... 428/119 |
| 6,027,798 * | 2/2000 | Childress .......... 428/319.3 |

FOREIGN PATENT DOCUMENTS

| | | |
|---|---|---|
| 2129931A | 11/1972 | (FR) . |
| 2718670A | 10/1995 | (FR) . |
| WO 95/03170A * | 2/1995 | (WO) . |
| WO97/16303 | 5/1997 | (WO) . |

OTHER PUBLICATIONS

Horsch, "Dreidimensionale Verstakungsmaterialien fuer Faserverbundwerkstoffe," Kunstoffe, vol. 80, No. 9, (Sep. 1990), pp. 1003–1007.

* cited by examiner

Primary Examiner—Vivian Chen (57) ABSTRACT

A method of heating or cooling an element which comprises providing a fluid circulation circuit within a Z-pin reinforced sandwich panel, the panel having fiber-reinforced resin composite face sheets separated in selected locations with a core so as to form a channel, said Z-pin being present both in the core and the channel; and transporting a heat exchange fluid through the channel forming said circulation circuit to provide heating or cooling for the element. The method can be employed in the leading edge for an airfoil for deicing.

7 Claims, 8 Drawing Sheets

CIRCULATION SYSTEM USING COLUMN CORE

REFERENCE TO RELATED APPLICATIONS

The present application is a divisional application based upon U. S. Patent application Ser. No. 08/582,297, filed Jan. 3, 1996, U.S. Pat. 6,027,798, which claims the benefit of U.S. Provisional Patent Application 60/007,190, filed Nov. 1, 1995.

FIELD OF THE INVENTION

The present invention relates to sandwich structures, and more particularly, to a method and result of creating a pin-reinforced foam or column core sandwich structure.

BACKGROUND OF THE INVENTION

Sandwich structures are used extensively in aerospace, automotive, and marine applications. Standard sandwich structures include a foam core and outer layers, called face sheets, that are adhesively bonded to the foam core. The face sheets of some sandwich structures are composites formed of fibrous materials, such as fiberglass or graphite, impregnated with a suitable resin. In a number of sandwich structure applications, the face sheets function to carry the applied loads, and the foam core transfers loads from one face sheet to the other. Other sandwich structures are configured so that the foam core also absorbs a portion of the applied loads. In either case, it is important that all layers maintain their connection to one another.

Maintaining the connections of the layers, particularly of the face sheets to the foam core during applied loading, is problematic. The most common source of face sheet separation stems from the relatively weak adhesive hold between the face sheets and the foam core, as compared to the applied loads. That is, the pulloff strength is low. Efforts to solve this problem in the past have focused on improving the adhesive that bonds the face sheets to the foam core.

Another source of layer separation is due to differences in the coefficient of thermal expansion (CTE) of the different materials used to form the layers. As a result, as temperatures rise or fall, the material used to form one layer may expand or contract more quickly than the material used to form another, adjoining layer. In addition to causing layer separation, CTE differences can significantly distort the shape of a structure, making it difficult to maintain overall dimensional stability. Current efforts to solve this problem focus on more closely matching the CTE of one layer to that of its adjoining layers.

A second issue in current sandwich structure design concerns how to optimize the thickness of a structure to meet the weight and/or space limitations of its proposed application. Sandwich structures are desirable because they are usually lighter in weight than solid metal counterparts, but they can be undesirable in that they usually require more space. Moreover, in some instances, it is necessary to pass an object (e.g., wires or tubing) through a structure. While this is relatively easy to accomplish in a solid metal structure by cutting holes in the structure, this is more difficult to accomplish in a sandwich structure. Simply carving out a portion of a layer of a sandwich structure can undesirably reduce the load carrying capability of the overall structure, as well as complicate the manufacture of the structure.

U.S. Pat. No. 5,186,776 describes a technique for reinforcement of composite laminates utilizing an apparatus and method for heating and softening the laminates by ultrasonic energy, penetrating the laminate, moving the laminate fibers aside, inserting a reinforcing fiber into the laminate and allowing the laminate and fiber to cool and bond. The technique disclosed in U.S. Pat. No. 5,186,776 is hereby incorporated by reference.

U.S. Pat. No. 4,808,461 describes a structure for localized reinforcement of composite structure including a body of thermally decomposable material that has substantially opposed surfaces, a plurality of reinforcing elements in the body that extend generally perpendicular to one body surface, and pressure intensifying structure on the other opposed body surface for applying driving force to the reinforcing elements for insertion into the composite structure as the body is subjected to elevated temperature and decomposes. The technique disclosed in U.S. Pat. No. 4,808,461 is hereby incorporated by reference.

U.S. Pat. No. 5,587,016 and U.S. Pat. No. 5,624,728 describe a planar composite panel constructed from two resin-impregnated fiber face sheet coverings and bonded to the two sides of a honeycomb core element, and a surrounding border element made of rigid foam board. The two planar faces of the rigid foam board are embossed with a pattern of indentations in the form of interlinked equilateral triangles which are sufficiently deep and close together to provide escape paths for volatiles generated inside the panel during curing of the resin in the face sheets by which the face sheets are bonded to the honeycomb core element and the foam board, to prevent the development of excessive pressure between the face sheets that otherwise would interfere with the bonding. The techniques disclosed in U.S. Pat. No. 5,589,016 and U.S. Pat. No. 5,624,728 are hereby incorporated by reference.

Thus, a need exists for a method of forming a foam core sandwich structure that resists distortion and separation between layers, in particular, separation of the face sheets from the foam core; maintains high structural integrity; resists crack propagation; and easily accommodates the removal of portions of foam core, as required by specific applications. The method should allow the structure to be easily manufactured and formed into a variety of shapes. The present invention is directed to providing such a method and the resulting structure. The present invention also relates to column core structural materials where the foam is removed but where the pins remain.

SUMMARY OF THE INVENTION

In accordance with the present invention, a method of forming a pin-reinforced foam core sandwich structure including positioning first and second face sheets about a foam core having at least one compressible sublayer and a plurality of Z-pins positioned therethrough is provided. The combination of the face sheets and foam core create a preliminary structure. The method also includes subjecting the preliminary structure to autoclave curing. During autoclave curing, the compressible sublayer is crushed and the Z-pins are driven into one or both of the face sheets, to form a pin-reinforced foam core sandwich structure.

In accordance with further aspects of this invention, a method of forming a column structure including removing a portion, or all, of the foam core by dissolving, eroding, melting, drilling, etc. the foam core is provided.

In accordance with other aspects of this invention, a foam core sandwich structure including first and second face sheets surrounding a foam core is provided. The foam core sandwich structure further includes a plurality of Z-pins positioned through the foam core and through, either partially or wholly, the face sheets.

In accordance with still further aspects of this invention, a column structure including first and second face sheets held in spaced apart relation by a plurality of Z-pins extending between the first and second face sheets. The Z-pins may be partially, or wholly, positioned through the face sheets.

In accordance with yet further aspects of this invention, the foam core includes a high density foam sublayer, and at least one low density foam sublayer. The preferred arrangement includes a first and second low density foam sublayer, one placed on each side of the high density sublayer. The plurality of Z-pins are placed throughout the foam core, extending from the outer surface of the first low density foam sublayer through to the outer surface of the second low density foam sublayer.

In accordance with yet other aspects of this invention, preferably, the sublayers are formed of polyimide or polystyrene, the Z-pins are formed of stainless steel or graphite, and the face sheets are formed of partially cured fiber/resin composite materials.

In accordance with still yet further aspects of this invention, the step of autoclave curing includes placing the preliminary structure in a vacuum bag, performing controlled heating and pressurizing of the preliminary structure within the bag, and removing the structure once a specific temperature/pressure regime has been accomplished.

From the foregoing description, it will be appreciated that a new and improved method of creating sandwich structure is provided by the present invention. In addition, a new and improved sandwich structure is provided by the invention. A pin-reinforced foam core sandwich structure formed in accordance with this invention resists deformation and face sheet separation. The structure is easy to form and has a wide range of uses, in addition to the uses made of currently available sandwich structures. In this regard, either of the foam core sandwich structure and column structure may be used in a variety of structural aerospace applications. The column structure is particularly adapted for use in actively-cooled circuit boards, actively-cooled electronics racks, and anti-icing leading edge structures, where a heat transfer fluid is circulated in the gap between the outer face sheets. Further the risk of face sheet separation due to variations in CTE between materials is greatly reduced since the plurality of pins continuously hold the face sheets in proper alignment.

Portions of the structure may be easily removed without compromising the structural integrity of the sandwich structure and without complicated manufacturing techniques.

BRIEF DESCRIPTION OF THE DRAWINGS

The foregoing aspects, and many of the attendant advantages of this invention, will become more readily appreciated as the same becomes better understood by reference to the following detailed description, when taken in conjunction with the accompanying drawings, wherein.

DETAILED DESCRIPTION OF THE PREFERRED EMBODIMENTS

Figure 3:
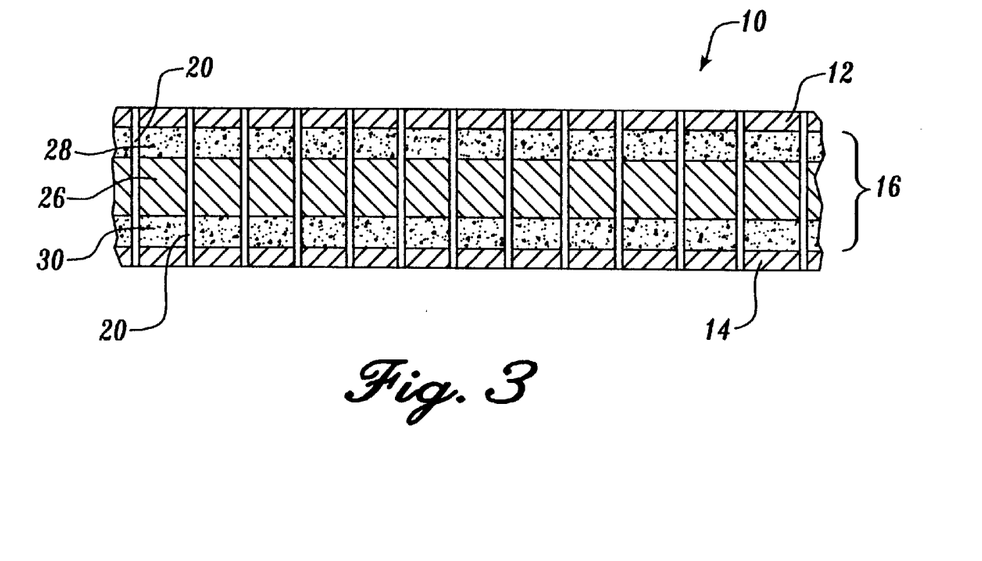
FIG. 3 is a cross-sectional view of a portion of a pin-reinforced foam core sandwich structure formed in accordance with the present invention.
Figure 4:
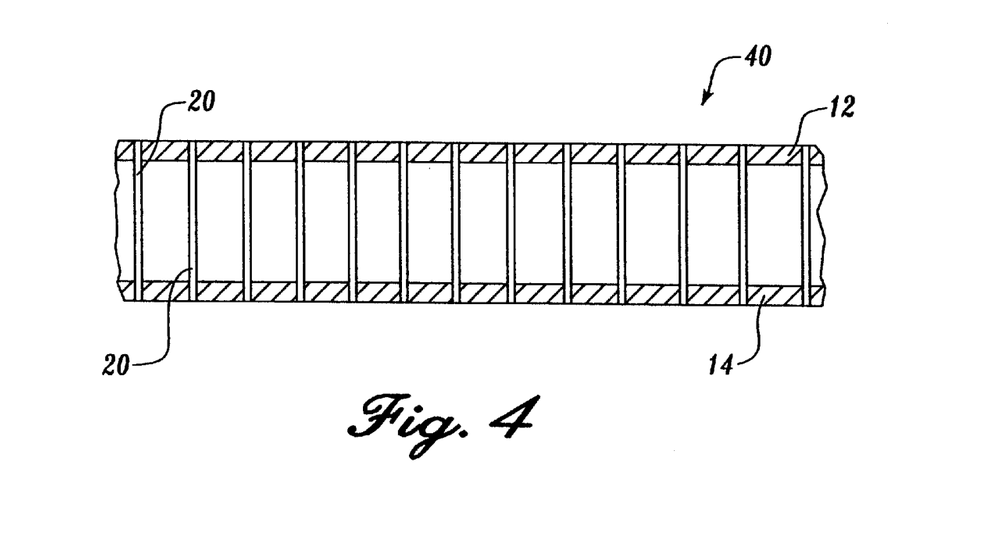
FIG. 4 is a cross-sectional view of a portion of a column structure formed in accordance with the present invention.

The present invention provides a method of creating pin-reinforced sandwich structures and the structures formed by the method. Two exemplary structures 10, 40 are shown in FIGS. 3 and 4. The method includes creating a preliminary structure of the type shown in FIGS. 1 and 2, and autoclave curing the structure. In general, the method includes creating a preliminary structure by positioning first and second face sheets 12, 14 on each side of a foam core 16. The foam core 16 includes at least one compressible sublayer and a plurality of Z-pins 20 positioned transversely through the foam core 16. During autoclave curing of the preliminary structure, the compressible sublayer is crushed, and the plurality of Z-pins 20 are driven into one or both of the face sheets, creating the pin-reinforced foam core sandwich structure 10 (FIG. 3). If desired, a portion, or all, of the foam core 16 can be removed to create a column structure 40 (FIG. 4).

Figure 1:
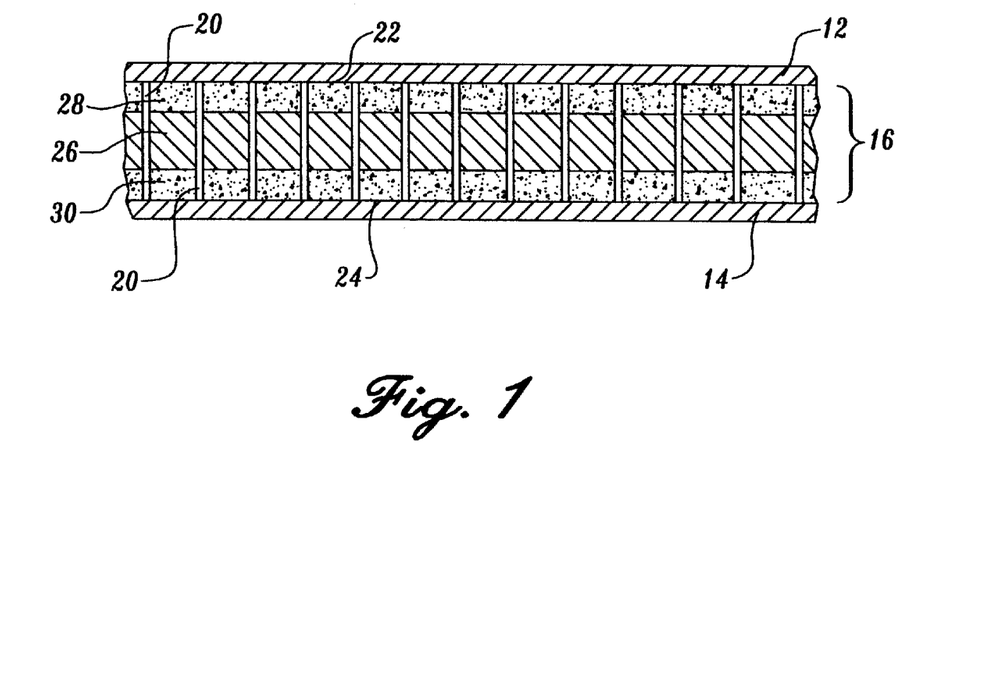
FIG. 1 is a cross-sectional view of a first embodiment of a preliminary structure formed in accordance with the present invention.

FIG. 1 is a cross-sectional view of a portion of the preliminary pin-reinforced foam core sandwich structure before autoclave curing. The preliminary structure includes the foam core 16 and the plurality of Z-pins 20. In a first preferred embodiment, the Z-pins are oriented transverse to the plane of the foam core 16 and extend through the foam core 16 from one outer surface 22 to the opposed outer surface 24.

Figure 2:
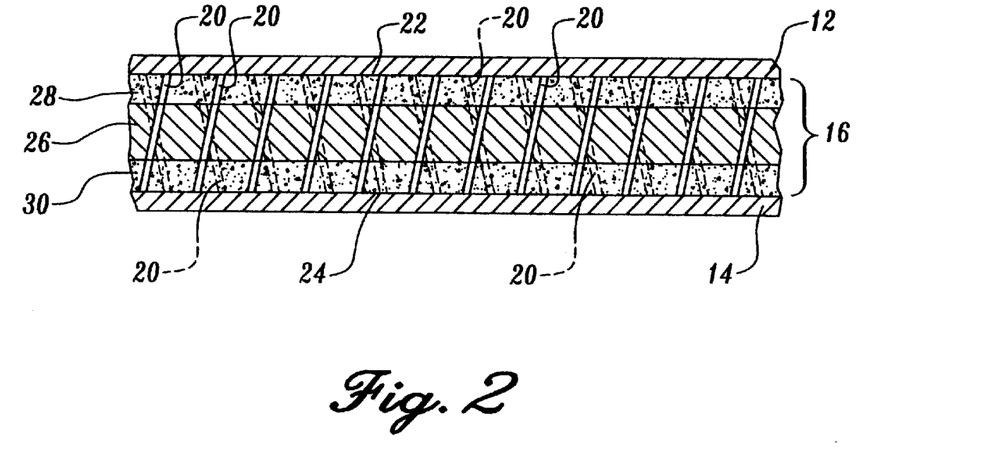
FIG. 2 is a cross-sectional view of a second embodiment of a preliminary structure formed in accordance with the present invention.

In a second preferred embodiment shown in FIG. 2, the Z-pins are angled, rather than transverse, to the plane of the foam core 16. Angles even as great as 45° from transverse have been found to work with some materials. Interlacing of angled Z-pins (as shown in FIG. 2) is a configuration that has been found to work particularly well for reinforcing face sheets around bolt holes and thus helping to restrict the face sheets from cracking. The Z-pins are optimally inserted at both plus and minus angles. The precise orientation of the Z-pins will vary according to the needs of the particular application.

Generally the pin areal density is about 0.75%, which means for 20 mil diameter pins that the pins are about 0.125-inches apart. If the pins are angled, they form tiny trusses between the skins and their length. In this case, spacing is a function of the truss angle, as those of ordinary skill will understand.

The first and second face sheets 12, 14 are positioned adjacent the foam core 16, one face sheet touching each foam core outer surface 22, 24. Depending upon a designer's preferences, a layer of adhesive (not shown) may be used to attach any of the layers to an adjoining layer. The pin-reinforced foam core 16 itself, may be formed using known methods (e.g., stitching or needling) or may be purchased commercially from companies such as Foster-Miller, Inc., in Waltham, Mass.

As shown in FIGS. 1, 2, and 3, the preferred foam core 16 is a closed cell foam that includes three sublayers: a high density foam sublayer 26 and first and second low density foam sublayers 28, 30, one located on each side of the high density foam sublayer 26. While three layers are shown, it is to be understood that the foam core 16 may be composed of any number of sublayers, depending on the precise application and the precise response required during autoclave curing. For example, the foam core may be only a single low density sublayer; or, it may be a stack of alternating low density and high density sublayers. The only required feature of the foam core 16 is that it contain at least one sublayer that will crush during autoclave curing. Foam, such as low density polyimide (e.g., Rohacel™) or low density polystyrene (e.g., Styrofoam™), are the presently preferred low density sublayer materials, since they are easy to form and do not require extremely high temperatures or pressures in order to crush easily during autoclave curing.

If a high density sublayer is included, it should be made of a material that will not crush during autoclave curing. Obviously, the precise temperatures and pressures to be used during autoclave curing will affect the selection of the material used to form the high density sublayer. Further considerations to be taken into account when selecting an appropriate high density sublayer material, whether the high density sublayer is to be removed after autoclave (as described below) and the preferred method for removing it. The Z-pins 20 may be of any suitably rigid material, e.g., stainless steel, titanium, copper, graphite, epoxy, composite, glass, carbon, etc. The Young's modulus of elasticity for the Z-pins should be greater than $10 \times 10^6$ in order for the pins to have suitable rigidity. Additionally, the Z-pins may be barbed, where appropriate.

The first and second face sheets 12, 14 are, in the case of thermosets, preferably formed of a partially cured fiber/resin composite material. Composite face sheets that are not significantly cured beyond B-stage may be used (i.e., minimal cross-linking has occurred between resin molecules; the resin can still flow.) If composites are used as face sheets, the effect that the below-described autoclave procedure will have on the face sheets needs to be considered so that the optimal temperature/pressure autoclave cure regime can be determined. The present invention will not work with fully cured composite face sheets for the autoclave curing method of insertion. Fully cured composites are too hard to force pins into. Composite fibers suitable for use in composite face sheets include glass, graphite, arimide, ceramic, etc. Suitable resins include epoxy, bismaleimide, phenolic, etc. (Virtually any thermoplastic or thermoset resin will suffice.) Various procedures are available for laying up composite face sheets. Since such procedures are generally known to those skilled in the art of composites, they are not described here. Additionally, particles such as rubber or plastic may be added to the composition. Although thick, solid metals have not been found to work well as face sheets, metal foil or metal foil/resin compositions may be used.

FIG. 3 is a cross-sectional view of a portion of a pin-reinforced foam core sandwich structure 10, after the structure has been autoclave cured in accordance with the teachings of the present invention. As will be appreciated by those skilled in the art, autoclave curing involves placing a structure in a vacuum bag, performing controlled heating and pressurizing of the contents within the bag, and removing the contents once a specific temperature/pressure regime has been accomplished.

As previously noted, the combination of face sheets 12, 14 and foam core 16 illustrated in FIGS. 1 and 2 and described above, form the preliminary structure that is subjected to autoclave curing. The pressure produced during autoclave curing presses the face sheets 12, 14 toward one another as the temperature cures the resin. The pressure causes the low density sublayer to crush, thus driving the Z-pins 20 into the face sheets 12, 14. The high density sublayer, if present, remains intact and acts as a support for holding the Z-pins 20 as they are pushed into the face sheets.

Those skilled in the autoclave curing art will understand that the particulars of the autoclave curing regime will vary according to the materials used and the results desired. The use of partially cured composite face sheets will obviously effect the time, and possibly the pressure, required to produce the desired result, i.e., drive the pins through the face sheets.

As an example, good results have been obtained using: partially cured 0.080 inch thick first and second face sheets formed of graphite fibers and 350° F.-cure epoxy; 0.100 inch thick first and second low density sublayers formed of 5 lbs/ft$^3$ density polyimide foam; a 0.210 inch thick high density sublayer formed of 20 lbs/ft$^3$ density polyimide foam; and a plurality of 0.020 inch diameter stainless steel Z-pins spaced 0.25 inches from each other. The preferred autoclave curing regime for this example includes: placing the structure in a vacuum pressure bag at ambient temperature (72° F.); pulling a vacuum on the bag; placing the bag in a pressure oven;

pressurizing the contents of the oven to 20 psi; heating the contents at 5° F./minute until 350° F. is reached; maintaining 350° F. with 20 psi for 2 hours; reducing the bag temperature 5° F./minute until ambient temperature is reached; eliminating the pressure; and removing the vacuum bag. This process will crush the first and second low density layers, drive the pins through the face sheets, and finish curing the composite face sheets. Typically, autoclave curing includes raising the pressure after the cure temperature has been reached. For the above example, however, this added pressure is not needed, and if present, would crush the 0.210 inch thick high density polyimide sublayer.

As a second example, good results have also been obtained using the same components and autoclave curing steps recited above, except 250° F.-cure resin is substituted for the 350° F.-cure resin, 10 lbs/ft$^3$ polystyrene is used for the low density sublayer, 40 lbs/ft$^3$ polystyrene is used for the high density sublayer, and a maximum cure temperature of 250° F. is used instead of 350° F.

As will be readily appreciated by those skilled in this art and others, the thickness of the face sheets 12, 14 and foam core 16 may vary. Acceptable results have been obtained for foam cores of between 0.125 inches and 1.25 inches.

Exemplary face sheet thicknesses for a graphite/epoxy range between roughly 0.050 to 0.080 inches. Using small thicknesses for the face sheets has the advantage of requiring very little crushing of the low density sublayer during autoclave curing in order to drive the Z-pins through the face sheets. Exemplary Z-pin thicknesses are between 0.010 to 0.030 inches in diameter, spaced between 0.0625 to 0.25 inches from each other. It is to be understood that the dimensions discussed can vary greatly depending on the application of the resulting structure, the materials used to form the structure, and the specific autoclave curing regime.

Once the preliminary structure has been autoclave cured, any Z-pins 20 that protrude beyond the outer surface of the face sheet may be shaved off using standard milling machines, e.g., planes, grinders, sanders, etc. Preferably the pressurizing mechanism used by the autoclave curing system will include pressing surfaces that cover the entire outer surface of the face sheets. Using such all-covering pressing surfaces prohibits the Z-pins 20 from sticking out beyond the outer surface of the face sheets, and thus, eliminates the step of having to shave them off. The present invention also encompasses using an autoclave curing regime that drives the Z-pins 20 only part way through the face sheet.

For applications requiring a hollow space between the face sheets 12, 14, the foam core 16 may be partially or fully removed from the sandwich structure to form a column structure 40. The method of removal will depend upon the materials selected for the foam core 16. For example, the foam sublayers described above may be dissolved using a solvent, such as methylethyl ketone, and subsequently flushed from the structure using water. Other methods of sublayer removal include erosion, melting, acid baths, drilling, laser cutting, etc. FIG. 4 is a cross-sectional view of a pin-reinforced foam core sandwich structure 10 after the foam core 16 has been entirely removed.

As will be readily appreciated from the foregoing description, the method of the invention provides a superior sandwich structure. The pin-reinforced foam core sandwich structure has high structural integrity that resists deformation and face sheet separation by using a plurality of Z-pins to transfer loads between face sheets. The pin-reinforced foam core sandwich structure is easy to form and has a wide range of uses. The risk of face sheet separation due to variations in CTE between materials is greatly reduced, since the pins continuously hold the face sheets in proper alignment. The need to remove portions of the structure may be easily accommodated without compromising the structural integrity of the article, since the pins remain embedded in the face sheets even after sublayer removal. The removal step is also straightforward, so as to not unnecessarily complicate the manufacturing process.

Figure 5:
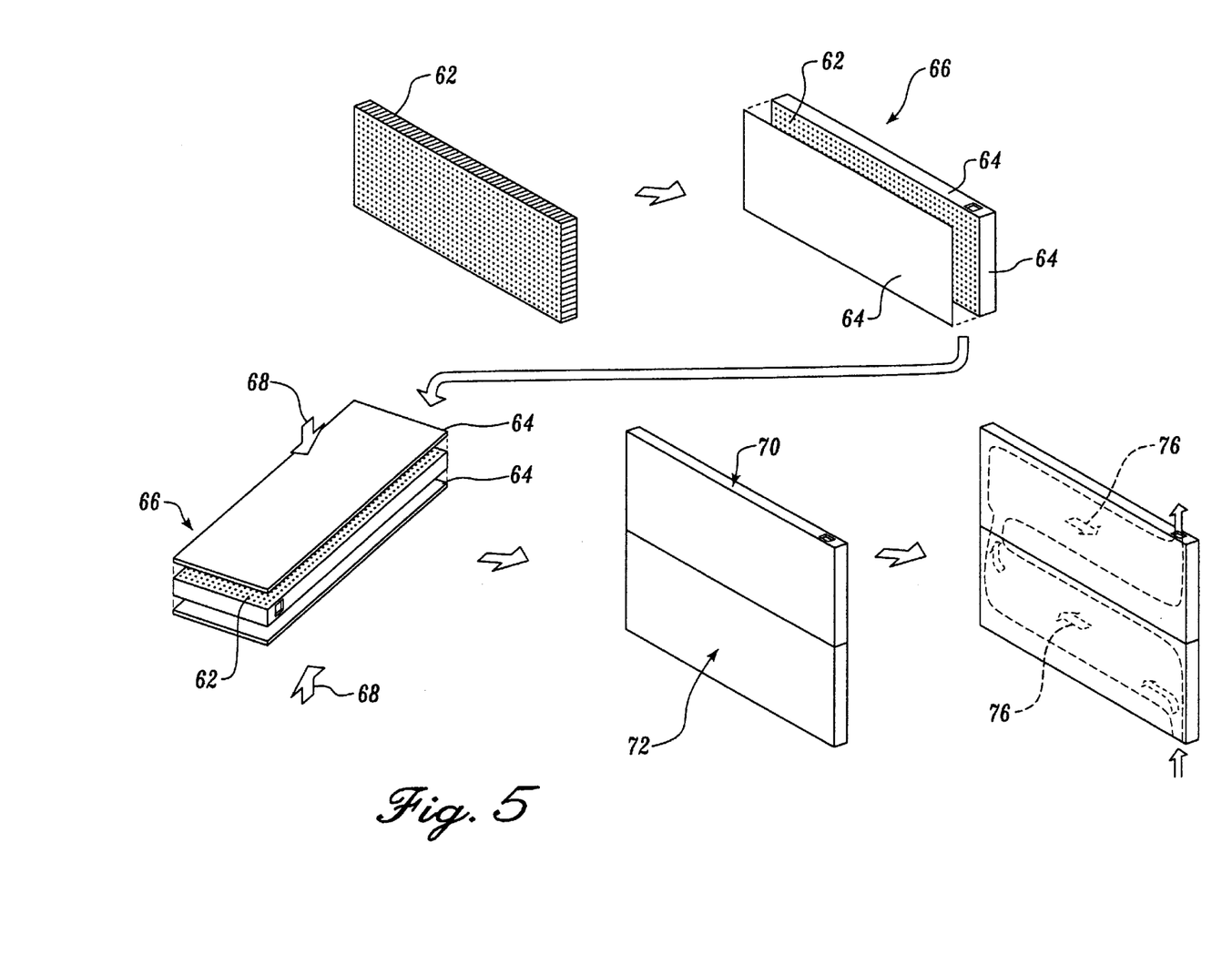
FIG. 5 is a perspective schematic view of structural cooling panels incorporating the present invention.

FIGS. 5–9 illustrate different applications of pin-reinforced sandwich structures formed in accordance with the present invention. FIG. 5 is a perspective schematic view of a structural cooling panel formed of a pin-reinforced sandwich structure formed in accordance with the present invention. Formation of the panel begins with a flat, rectangularly-shaped, water-soluble, foam core 62 having a plurality of Z-pins extending between the major faces of the core. The foam core 62 is faced with partially cured fiber/matrix laminate 64 to form a preliminary structure 66. The preliminary structure 66 is crushed during the autoclave curing step (indicated schematically by short arrows 68) described above, driving the Z-pins into the laminate and forming a foam core sandwich structure 70. A second, similar foam core sandwich structure 72 is assembled to the first structure 70. Lastly, portions of the water-soluble foam core are dissolved by circulating a suitable liquid 76 (or gas) through the interior of the assembled core sandwich structures. Obviously, during or after formation of the cord sandwich structures 70, 72, the edges of the structures are enclosed, and inlets and outlets added. After the water soluble foam core is removed, a cooling (or heating) liquid can be circulated through the now porous panels.

Figure 6A:
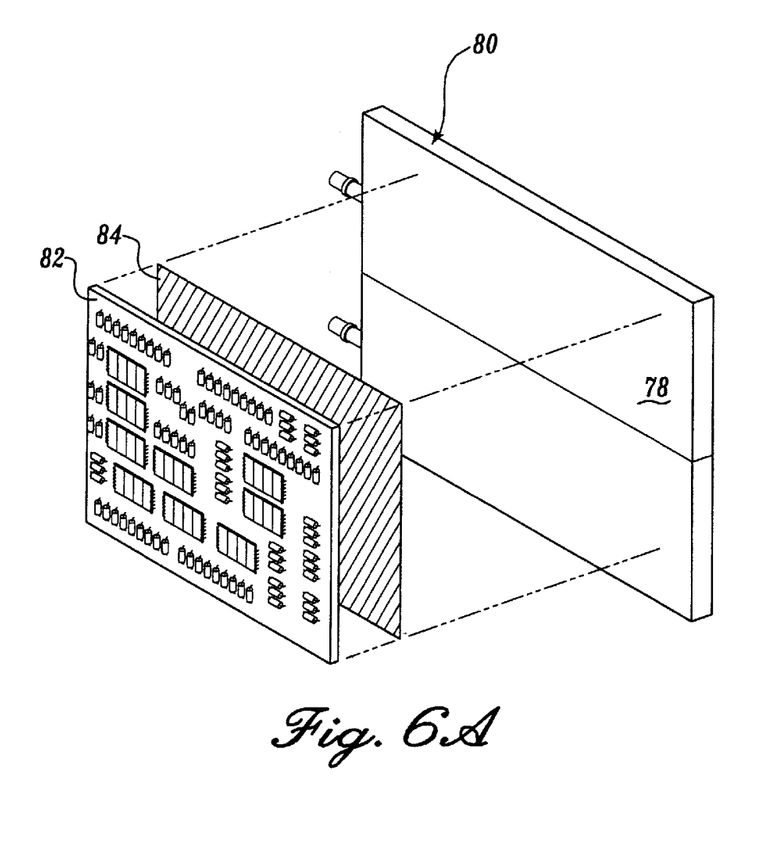
FIGS. 6A and 6B are perspective schematic views of a, cooled circuit board support incorporating the present invention.
Figure 6B:
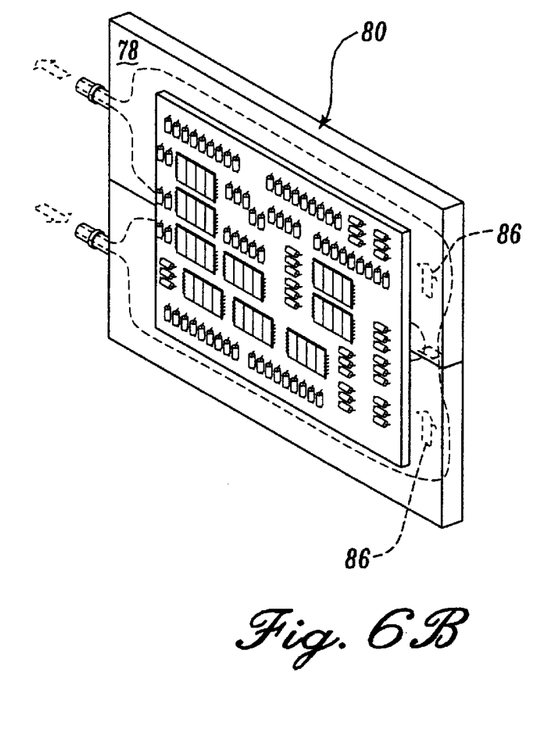

FIGS. 6A and 6B are perspective schematic views of how structural cooling panels of the type shown in FIG. 5 can be used to cool electronic circuit boards. Back support 80 is formed in the manner illustrated in FIG. 5 and described above. Then, an electronic circuit board 82 is attached to one of the faces 78 of the back support 80 using a thermally conductive bonding agent 84. Fluid 86 circulated through the back support 80 cools the circuit board by transferring heat generated by the board to the fluid 86.

Figure 7A:
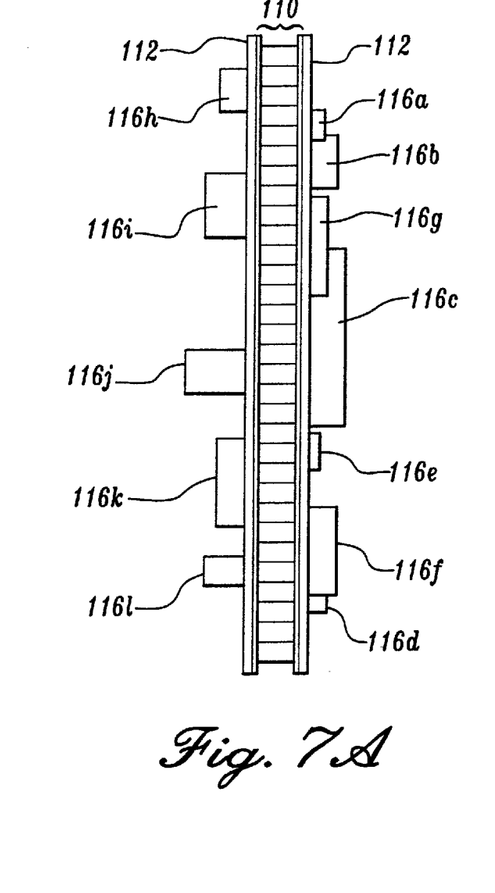
FIG. 7A is a side view of an alternative cooled circuit board support incorporating the present invention.
Figure 7B:
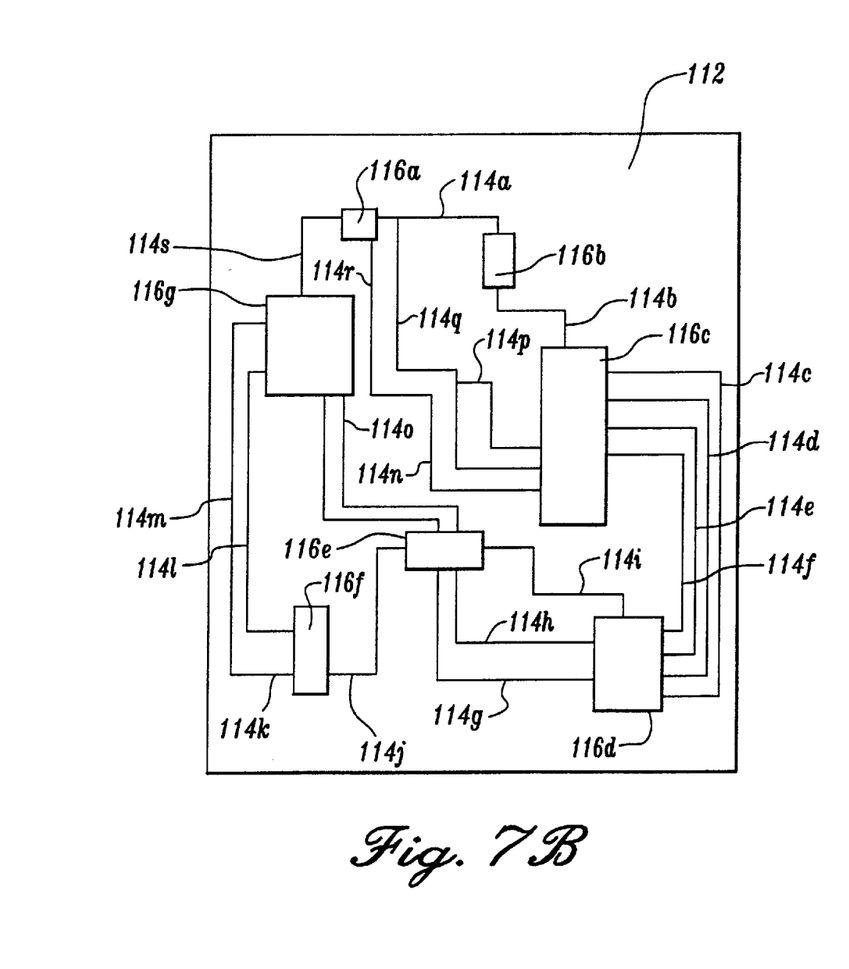
FIG. 7B is a front view of the cooled circuit board of FIG. 7A.

Alternative methods of forming a cooled circuit board are also contemplated. Referring to FIGS. 7A and 7B for example, a thin fiberglass pin-reinforced sandwich structure 110 could be manufactured according to the invention and could have copper plated circuit boards 112 attached to both sides. The copper plates are etched to create power circuit traces 114$a$–114$s$ (see FIG. 8) for connecting together surface mounted components 116$a$–116$l$. A cooling medium flowing through the pin reinforced sandwich structure 110 will cool both the copper plated circuit boards 112 and the surface mounted components 116$a$–116$l$.

Figure 8:
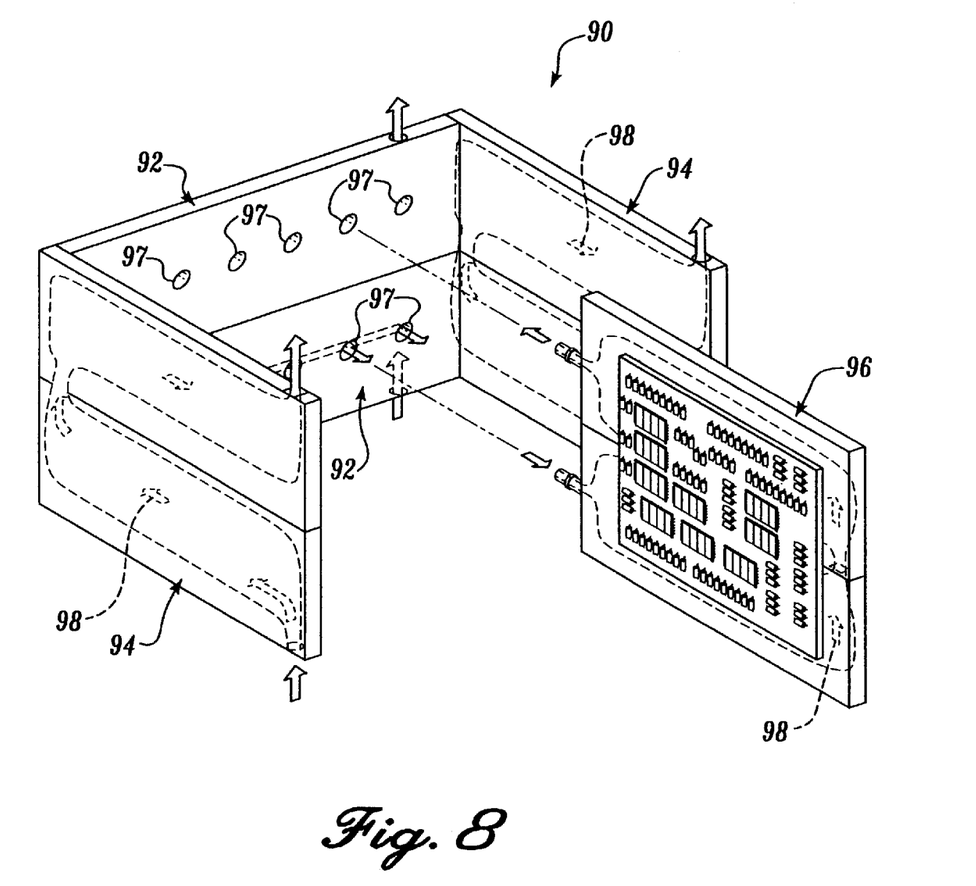
FIG. 8 is a perspective schematic view of an electronics rack incorporating the panels and supports shown in FIGS. 5–8.
Figure 9:
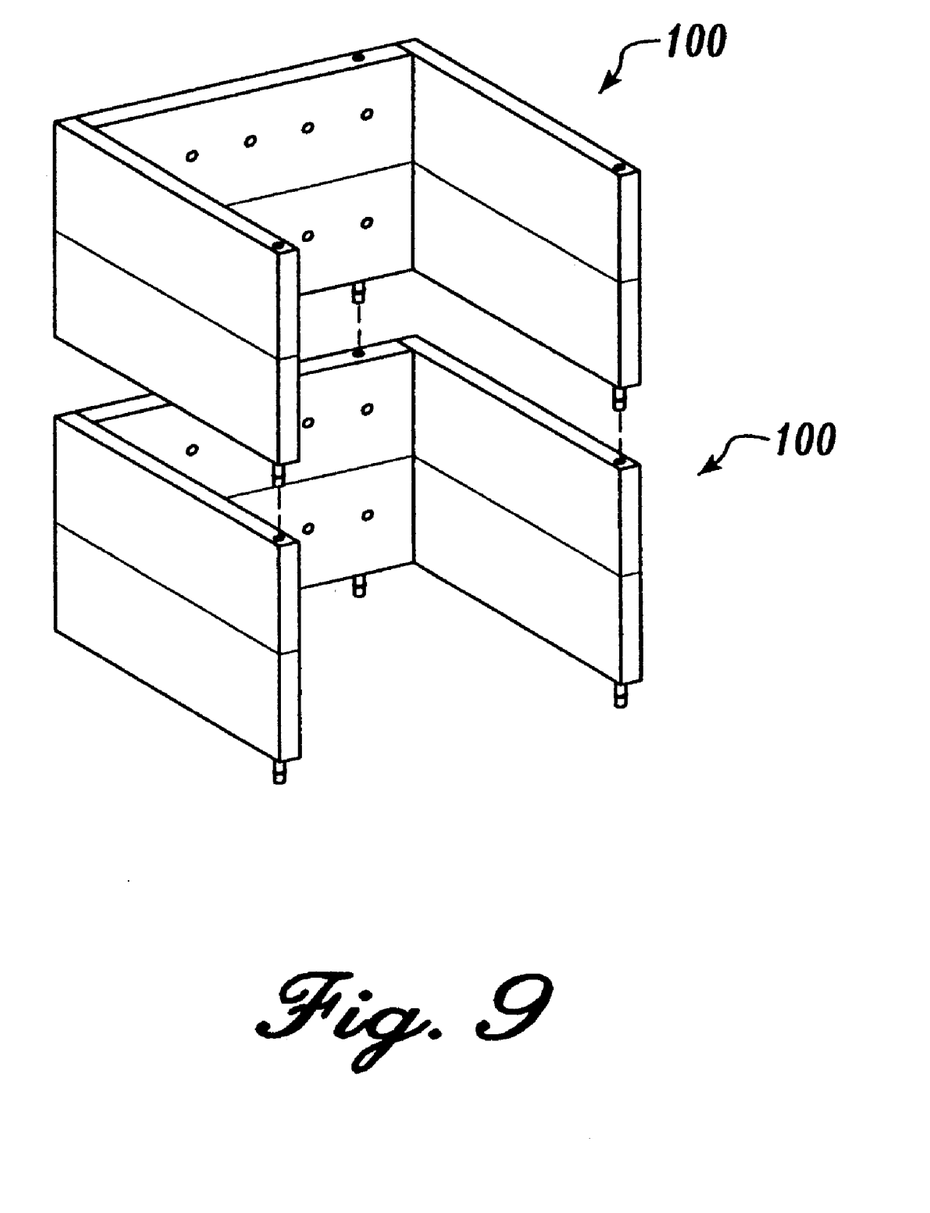
FIG. 9 is a perspective schematic view of an assembly formed of multiple electronics racks of the type shown in FIG. 9.

FIG. 8 is a perspective schematic view of an electronics rack 90 formed from panels and board of the type shown in FIGS. 5, 6A, 6B, 7A, and 7B. The rack 90 includes one or more rigid back panels 92 and side panels 94, each formed in the manner illustrated in FIG. 5 and described above. The back panels are joined at their edges so that their major faces are coplanar. The side panels 94 are joined at their ends to opposed ends of the back panels 92. The side panels 94 lie orthogonal to the back panels 92. The inlets and outlets of the internal cavities of the porous channels are coupled together or to separate inlets and outlets, as shown. One or more cooled circuit boards 96 formed in a manner illustrated in FIGS. 6A, 6B, 7A, and 7B and described above are joined orthogonally to the back panels 92. As shown, preferably, the cooled circuit boards 96 have inlets and outlets that are coupled to inlets and outlets 97 formed in the facing surface of the back panel 92. A cooling medium 98 is circulated throughout the cavities in the various panels and boards that form the rack 90. FIG. 9 is a perspective schematic view of an assembly demonstrating that multiple electronics racks 100 (formed in the manner illustrated in FIG. 8) may be stacked vertically to accommodate additional cooled circuit boards.

Figure 10:
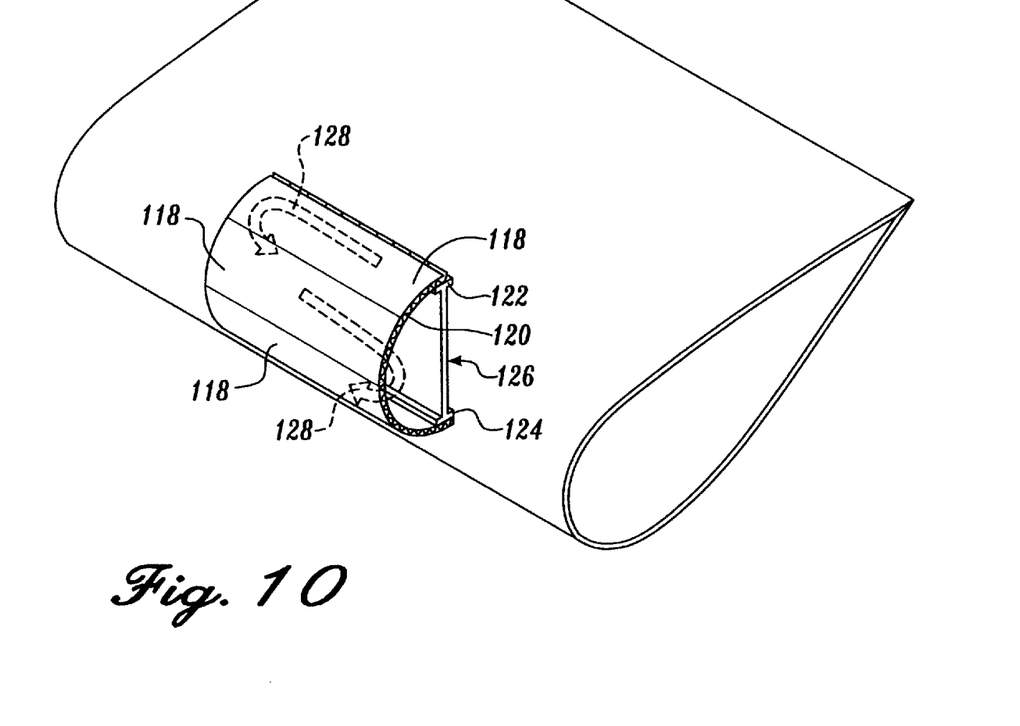
FIG. 10 is a perspective schematic view of a wing anti-ice leading edge structure incorporating the present invention.

FIG. 10 is a perspective schematic illustrating the application of a pin-reinforced sandwich structure formed in accordance with this invention to a wing anti-ice leading edge. Multiple curved panels 118 formed of a pin-reinforced sandwich structure having angled Z-pins 120 are attached side-by-side to form the wing leading edge, which extends approximately between upper and lower ends 122, 124 of a wing front spar 126. A support, such as a steel bonding plate (not shown), may be used to strengthen the interior sides of the multiple panels 118 where needed. Additionally, different materials may be used to form different panels. Warm air 128 or fluid circulated within the panels is used to maintain the wing leading edge above freezing to avoid the formation of wing ice.

A further application to which the present invention structures may be applied is in the formation of a lightweight honeycomb panel structure. See, for example, U.S. Pat. No. 5,445,861 to Newton et al., which describes a structure that comprises a top panel, a bottom panel, and a large-celled honeycomb layer disposed between the top and bottom panels. The present invention could be used to form the top and bottom panels.

The present invention also could be used to form structures of the type described in U.S. Pat. No. 5,589,016 and U.S. Pat. No. 5,624,728, where a composite panel is constructed from two resin-impregnated fiber face sheet coverings and bonded to the two sides of a honeycomb core element and a surrounding border element is made of a rigid foam board. The present invention could be used as the honeycomb core element and/or the sheet coverings.

While presently preferred embodiments of the invention have been illustrated and described, it will be appreciated that various changes can be made therein without departing from the spirit and scope of the invention. In particular, the size and number of layers, their chemical composition, and the particulars of the autoclave curing regime will vary greatly from one application to another.

What is claimed is:

1. A method for heating or cooling an element, comprising the steps of:

(a) defining a fluid circulation circuit for a working fluid, the circuit including a channel within a Z-pin reinforced sandwich panel, the panel having fiber-reinforced resin composite face sheets separated in selected locations with a core and in other locations only with the Z-pin reinforcement, having a plurality of discrete Z-pins extending between face sheets of the panel, the panel also having the Z-pins extending between the face sheets in the channel and, in the selected locations, through the core; and (b) transporting the working fluid to the element within the channel to provide heating or cooling for the element.

2. The method of claim 1 wherein the panel is part of an electronics rack.

3. The method of claim 1 wherein the panel is a leading edge of an airfoil.

4. A leading edge for an airfoil, comprising:

(a) opposed facesheets of fiber-reinforced resin matrix composite material shaped to form the leading edge of an airfoil and adapted for attachment to a wing front spar;

(b) a core sandwiched in selected locations between the facesheets to define a channel, where the core is absent, for contact with and passage of a working fluid between the facesheets to avoid the formation of wing ice;

(b) Z-direction fiber reinforcement in the form of discrete pins extending between the facesheets in the locations having the core as well as in the channel, the reinforcement being present in a pin spacing of about 0.0625 to 0.25 inches from each other for connecting the facesheets and for improving pulloff resistance of the facesheets in shear.

5. The leading edge of claim 4 wherein the Z-direction fiber reinforcement is carbon fiber and the core is foam.

6. The leading edge of claim 4 further comprising a circulating fluid in the channel for avoiding the formation of wing ice on the leading edge.

7. The leading edge of claim 6 wherein the facesheets extend approximately between upper and lower ends of a wing front spar.

* * * * *